UNITED STATES PATENT OFFICE.

GEORGE WILLIAM SINCLAIR, OF PETERSHAM, ENGLAND.

PROCESS FOR GRANULATING CALCIUM CYANAMID.

1,278,044.  Specification of Letters Patent.  Patented Sept. 3, 1918.

No Drawing.  Application filed December 19, 1916.  Serial No. 137,916.

*To all whom it may concern:*

Be it known that I, GEORGE WILLIAM SINCLAIR, a subject of the King of Great Britain and Ireland, residing at Reston Lodge, Petersham, Surrey, England, have invented a certain new and useful Improved Process for Granulating Calcium Cyanamid, of which the following is a specification.

This invention relates to an improved process for granulating calcium cyanamid.

In the manufacture of granulated calcium cyanamid it has hitherto been proposed to add water to the pulverized cyanamid and by suitable mechanical means to form the granulated calcium cyanamid from the pasty mass produced by the addition of water to the pulverized cyanamid.

It is well known that when water is added to commercial calcium cyanamid in sufficient quantity the following reactions may take place:—

1. Decomposition of any remaining free calcium carbid with the formation of acetylene;
2. Slaking of the free calcium oxid;
3. Decomposition of the calcium cyanamid ($CaCN_2$) with the formation of other nitrogen products.

Experience has shown that the simple addition of water to cyanamid in the quantities suitable for producing the granulated material and by the method hitherto practised does not permit the reactions which take place between the calcium compounds and the water to be carried to completion so that these reactions, which are exothermic, are continually proceeding to a greater or less extent, and in circumstances where the product may be heated to a certain temperature or where a rise in temperature may occur spontaneously, as, for example, where large masses are stored in a confined space, such rise in temperature will accelerate the reactions referred to above until the free water has been entirely combined or evaporated, and if the rise in temperature be allowed to continue the granules will ultimately break down and the cyanamid revert to its original powdery condition.

The object of this invention is to provide an improved process wherein the reactions above referred to can be carried to completion in part or as a whole during the process of formation of the granules and in such a manner that these reactions have little or no influence on the subsequent stability of the granules.

The invention consists in a process for granulating calcium cyanamid in which the addition of water or of a watery solution to the commercial cyanamid is effected in two or more separate operations.

The invention also consists in the improved process hereinafter described.

In carrying our invention into effect in one convenient manner we carry out the first operation (known hereafter as the slaking operation) by adding to the calcium cyanamid a quantity of water or watery solution (preferably between 10% and 20% by weight of the solid matter to be treated) under circumstances which permit the heat generated by the reactions to be controlled but kept sufficiently high so that the reactions desired are rapidly effected without the formation and loss of ammonia. To this end the temperature should preferably exceed 60° C.

It has been found that the conditions desired can be obtained and kept uniform by varying the quantity of water added and the temperature of the mass.

The cyanamid treated in this manner is if necessary cooled by suitable means before being subjected to the second part of the process known hereafter as the drying operation.

The cyanamid which so far has remained in the powdery form is now treated by adding a further quantity of water or watery solution corresponding to at least 12% of the weight of the material produced by the slaking operation, and by suitable mechanical means such for instance as an arrangement of two or more compressing rollers the semi-plastic mass is formed into flakes or small aggregates which eventually form granules.

During the drying operation means are provided for controlling the temperature of the mass which may rise by reason of the reactions referred to not having been brought to completion in the first part of the process. In all circumstances it is desirable that the temperature should be kept sufficiently high so that the reactions may not be unduly prolonged but at the same time they must not proceed so rapidly that a decomposition of the granules occurs due to swelling, and by regulating the temperature the speed and the extent of the reactions can be controlled and the excess of water driven off so that the final product is a dry granular mass.

In order to check the speed of the reactions which may take place in the drying process, it is found advantageous to dilute the mass before it is treated with water or watery solution or simultaneously with such treatment with a certain proportion of suitable inert matter, as, for example, fine cyanamid dust which has already passed through the complete treatment forming the subject of this invention.

In order that the granules produced may be submitted to uniform conditions and assume a more or less regular form it is desirable to keep the mass in constant and uniform motion and this may conveniently be effected by the employment of hollow rotating cylinders placed horizontally or in a more or less inclined position.

The movements of the granules in contact with mechanical appliances may give rise to a certain proportion of dust but it is found that if the drying process takes place in an atmosphere more or less saturated with water vapor conveniently generated from the mass under treatment, the dust to a large extent will adhere to the surface of the granules or by reason of the moist atmosphere will form small aggregates which by the mechanical movement eventually become granules. It is therefore desirable that the appliances in which the process is conducted should be more or less closed in order that the requisite degree of humidity may be preserved.

It is to be understood that the invention is not to be confined to any particular form of construction of apparatus by means of which the process may be carried out and that we may vary the proportions of water or watery solution, the temperatures adopted for the various parts of the process and the number of operations as may be found in practice to give the most satisfactory results.

Having now described my invention what I claim as new and desire to secure by Letters Patent is:—

1. The process of granulating calcium cyanamid, which consists in adding to the pulverized cyanamid water sufficient to slake the cyanamid, cooling the mass heated by chemical reaction, adding to the slaked mass water in excess of twelve per cent. by weight, forming the cyanamid mass in aggregates by mechanical mass and drying the aggregates under agitation at a temperature sufficiently high to hasten granulation, but below the temperature of decomposition.

2. The process of granulating calcium cyanamid, consisting in employing pulverized cyanamid, slaking the pulverized cyanamid with water amounting to from ten to twenty per cent. by weight of the pulverized cyanamid, cooling the slaked mass from the temperature produced by reaction, adding water in excess of twelve per cent. by weight, employing mechanical means to form the cyanamid mass into aggregates, and drying the mass during agitation at a temperature high enough to hasten granulation, but not sufficiently high to produce decomposition.

3. The process of granulating cyanamid, consisting in employing pulverized cyanamid, slaking the cyanamid by the addition thereto of ten to twenty per cent. by weight of water, maintaining the slaking process at a temperature above sixty degrees C., cooling the mass from the temperature produced by reaction, adding from twelve to twenty per cent. of water, employing mechanical means to form the cyanamid mass into aggregates, and drying the aggregates during agitation at a temperature high enough to hasten granulation, but not sufficiently high to produce decomposition.

In testimony whereof I have signed my name to this specification.

GEORGE WILLIAM SINCLAIR.

Witnesses:
CHAS. P. PRESSLY,
EMILE BERTRAND.